United States Patent
Lamothe et al.

(10) Patent No.: US 12,496,324 B2
(45) Date of Patent: Dec. 16, 2025

(54) **INSOLUBLE FIBRE FERMENTABILITY AND SHORT CHAIN FATTY ACID PRODUCTION BY *BIFIDOBACTERIUM LONGUM***

(71) Applicant: SOCIETE DES PRODUITS NESTLE S.A., Vevey (CH)

(72) Inventors: Lisa Marcela Lamothe, Lausanne (CH); Stephane Duboux, St-Prex (CH); Florence Rochat, Montreux (CH); Rosa Aragao Borner, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 600 days.

(21) Appl. No.: 17/999,226

(22) PCT Filed: May 18, 2021

(86) PCT No.: PCT/EP2021/063162
§ 371 (c)(1),
(2) Date: Nov. 18, 2022

(87) PCT Pub. No.: WO2021/233923
PCT Pub. Date: Nov. 25, 2021

(65) Prior Publication Data
US 2023/0218695 A1    Jul. 13, 2023

(30) Foreign Application Priority Data

May 20, 2020    (EP) .................................... 20175624

(51) Int. Cl.
*A61K 36/48*  (2006.01)
*A61K 35/745*  (2015.01)
*A61P 1/14*  (2006.01)
*C12N 1/20*  (2006.01)
*C12N 1/22*  (2006.01)

(52) U.S. Cl.
CPC ............ *A61K 36/48* (2013.01); *A61K 35/745* (2013.01); *A61P 1/14* (2018.01); *C12N 1/20* (2013.01); *C12N 1/22* (2013.01)

(58) Field of Classification Search
CPC ......... A61K 36/48; A61K 35/745; A61P 1/14; C12N 1/20; C12N 1/22
See application file for complete search history.

(56) References Cited

FOREIGN PATENT DOCUMENTS

| CN | 106666091 | 5/2017 |
| CN | 108070542 A | 5/2018 |
| EP | 2289527 | 3/2011 |

OTHER PUBLICATIONS

European Office Action for Appl No. 21 726 644.4-1109 dated Nov. 28, 2024, 6 pages.
Costabile et al. "Effects of Soluble Corn Fiber Alone or in Synbiotic Combination with Lactobacillus rhamnosus GG and the Pilus-Deficient Derivative GG-PB12 on Fecal Microbiota, Metabolism, and Markers of Immune Function: A Randomized, Double-Blind, Placebo-Controlled, Crossover Study in Healthy Elderly (Saimes Study)" Frontiers in Immunology, Dec. 2017, vol. 8, article 1443, 13 pages.

(Continued)

Primary Examiner — Trevor Love
(74) Attorney, Agent, or Firm — K&L Gates LLP

(57) ABSTRACT

The present invention relates to a *Bifidobacterium longum* probiotic for use to improve fermentability of a plant fibre during gastro-intestinal tract passage in a subject, wherein said plant fibre has an insoluble fraction of between 40 to 80% (w/w).

8 Claims, 12 Drawing Sheets

(56) References Cited

OTHER PUBLICATIONS

Iwata et al. "The Screening Method of a Bifidogenic Dietary Fiber Extracted from Inedible Parts of Vegetables" J. Nutr Sci Vitaminol, 2009, vol. 55, pp. 385-388.
Lahtinen et al. "Probiotics modulate the Bifidobacterium microbiota of elderly nursing home residents" Age, 2009, vol. 31, pp. 59-66.
Hashemi et al. "Dietary Pea Fiber Supplementation Improves Glycemia and Induces Changes in the Composition of Gut Microbiota, Serum Short Chain Fatty Acid Profile and Expression of Mucins in Glucose Intolerant Rats" Nutrients, 2017, vol. 9, No. 11, 14 pages.
Crittenden et al. "In vitro fermentation of cereal dietary fibre carbohydrates by probiotic and intestinal bacteria" Journal of the Science of Food and Agriculture, 2002, vol. 82, pp. 781-789.

A

B

A

B

| OTU | Species to which OTU is related | 48h | | | | | | | |
|---|---|---|---|---|---|---|---|---|---|
| | | Control | Fiber 1 | pea fiber | B. longum NCC3001 | B. longum NCC3001 + Fiber 1 | | B. longum NCC3001 + pea fiber | |
| | | | | | | Native | Pre-cond | Native | Pre-cond |
| OTU2 | Bacteroides thetaiotaomicron | 8.13 | 8.13 | 8.62 | 8.41 | 8.36 | 8.41 | 8.37 | 8.35 |
| OTU5 | Bacteroides stercoris | 6.53 | 7.26 | 7.05 | 6.78 | 7.44 | 7.51 | 7.26 | 7.21 |
| OTU12 | Bacteroides vulgatus | 6.79 | 6.46 | 6.98 | 6.93 | 5.99 | 5.94 | 7.21 | 7.15 |
| OTU4 | Phascolarctobacterium succinatutens | 7.94 | 8.21 | 8.18 | 8.01 | 8.42 | 8.46 | 8.22 | 8.43 |

Fig. 9

INSOLUBLE FIBRE FERMENTABILITY AND SHORT CHAIN FATTY ACID PRODUCTION BY *BIFIDOBACTERIUM LONGUM*

CROSS REFERENCE TO RELATED APPLICATIONS

The present application is a National Stage of International Application No. PCT/EP2021/063162, filed on May 18, 2021, which claims priority to European Patent Application No. 20175624.4, filed on May 20, 2020, the entire contents of which are being incorporated herein by reference.

Insoluble complex dietary fibres have poor fermentability in the human gut because their structure makes them recalcitrant to utilization by the gut microbiota. This greatly reduces their beneficial physiological impact.

Soluble non-digestible oligosaccharides that are commonly used to increase dietary fibre content in food products may cause gastrointestinal discomfort due to their fast fermentation rate in the gut. Furthermore, they are perceived as unnatural and therefore not consumer friendly.

There is a clear need to improve the fermentability of complex dietary fibres in the human gut in order to increase their beneficial physiological impact but without causing any associated gastrointestinal discomfort.

SUMMARY OF THE INVENTION

The combination of a complex dietary fibre from pea with a probiotic, particularly *Bifidobacterium. longum* NCC 3001 (ATCC BAA-999, hereafter *B. longum* NCC 3001), results in a surprising improvement in fermentability of the fibre. When combined with the probiotic, fermentation of the fiber by the commensal microbes found in the gut also leads to an increased production of short chain fatty acids, such as acetate and propionate, which exert a positive effect on the host. These effects include regulation of immune disorder and appetite, as well as protection against colonic cancer.

Furthermore, the particular fermentation outcome indicates that this fibre and probiotic combination would not be predicted to cause intestinal discomfort due to excess gas production.

In a first aspect, the invention provides the use of a *Bifidobacterium* probiotic to improve fermentability of a plant fibre, wherein said plant fibre has an insoluble fraction of between 40 to 80% (w/w).

In a second aspect, the invention provides a composition comprising an effective amount of a Leguminoseae plant fibre and a *Bifidobacterium* probiotic, wherein said plant fibre has an insoluble fraction of between 40 to 80% (w/w).

In a third aspect, the invention provides a composition comprising an effective amount of a Leguminoseae plant fibre and a *Bifidobacterium* probiotic, wherein said plant fibre has an insoluble fraction of between 40 to 80% (w/w), and wherein said *Bifidobacterium* is obtained by a process comprising the steps of
a. Fermenting the *Bifidobacterium* in a bacterial growth medium; and
b. Harvesting the cultured *Bifidobacterium* probiotic.

In a fourth aspect, the invention provides a composition as described herein for use as a medical food.

BRIEF DESCRIPTION OF THE FIGURES

FIG. 9: Average absolute levels (log counts/mL) of OTUs (related to a given species) after 48 h of colonic incubations. The intensity of the shading correlates with the absolute abundance, normalized within each OTU for each of the time points (within each row). Statistically significant differences between the control and specific treatments within each OTU and time point are indicated in bold (p<0.05).

EMBODIMENTS OF THE INVENTION

Figure 1:
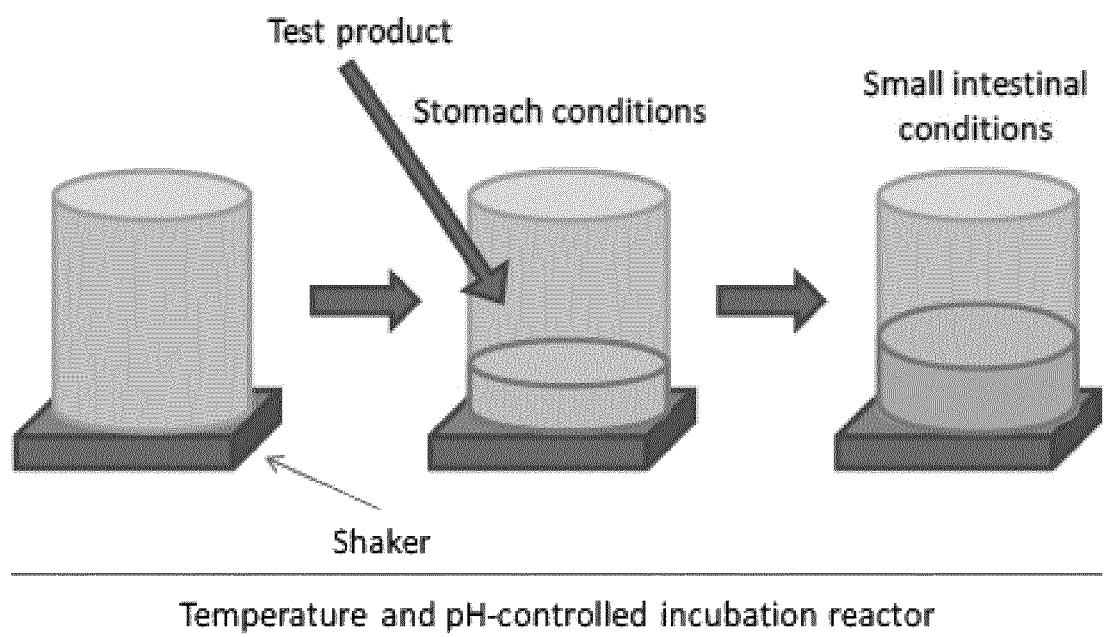
FIG. 1: Schematic of an adapted SHIME® system containing a reactor that consecutively simulates stomach and small intestinal conditions under both fed and fasted conditions.

The present invention relates in general to the use of a *Bifidobacterium longum* probiotic.

In particular, it relates to the use of a *Bifidobacterium longum* subsp. *longum* to improve fermentability of a plant fibre, wherein said plant fibre has an insoluble fraction of between 40 to 80% (w/w). In one embodiment, it relates to the use of a *Bifidobacterium longum* subsp. *longum* to improve in vivo fermentability of a plant fibre in a human subject.

In some embodiments, the probiotic *Bifidobacterium longum* subsp. *longum* is pre-conditioned by growing in the presence of fibre.

In some embodiments, the probiotic *Bifidobacterium longum* subsp. *longum* is pre-conditioned by growing in the presence of fibre in vitro.

In some embodiments, the probiotic is *B. longum* NCC 3001 (ATCC BAA-999).

In some embodiments, the probiotic *B. longum* NCC 3001 is pre-conditioned by growing in the presence of fibre in vitro.

Poaceae fibres such as corn fibre with high insoluble fractions can be used. In some embodiments, the Poaceae fibre has an insoluble fraction of between 70 to 80% (w/w). In some embodiments, the Poaceae fibre is corn fibre. In some embodiments, the corn fibre is a corn fibre mix comprising about 45% (w/w) corn fibre.

In some embodiments, the probiotic *B. longum* NCC 3001 is pre-conditioned by growing in the presence of corn fibre in vitro.

Leguminoseae fibres such as pea cell wall fibre with low insoluble fractions can be used. In some embodiments, the Leguminoseae fibre has an insoluble fraction of between 40-50% (w/w). In some embodiments, the Leguminoseae fibre is pea cell wall fibre.

In some embodiments, the probiotic *Bifidobacterium longum* subsp. *longum* is pre-conditioned by growing in the presence of fibre in vitro.

In some embodiments, the probiotic is *B. longum* NCC 3001 (ATCC BAA-999).

In some embodiments, the probiotic *B. longum* NCC 3001 is pre-conditioned by growing in the presence of pea cell wall fibre in vitro.

The plant fibre can be a combination of a Poaceae and a Leguminoseae fibre.

In one embodiment, improvement of plant fibre fermentability corresponds to reduced gas formation, for example in the gastro-intestinal tract of a subject.

In one embodiment, improvement of plant fibre fermentability corresponds to reduced gas formation, for example in the gastro-intestinal tract of a subject, wherein the probiotic is *B. longum* NCC 3001 (ATCC BAA-999), and wherein *B. longum* NCC 3001 is pre-conditioned by growing in the presence of pea cell wall fibre in vitro.

In one embodiment, improvement of plant fibre fermentability corresponds to increased total short chain fatty acid production, for example in the gastro-intestinal tract of a subject. In one embodiment, improvement of plant fibre fermentability corresponds to increased acetate production, for example in the gastro-intestinal tract of a subject. In one embodiment, improvement of plant fibre fermentability corresponds to increased propionate production, for example in the gastro-intestinal tract of a subject.

In one embodiment, improvement of plant fibre fermentability corresponds to increased total short chain fatty acid production, for example in the gastro-intestinal tract of a subject, wherein the probiotic is *B. longum* NCC 3001 (ATCC BAA-999), and wherein *B. longum* NCC 3001 is pre-conditioned by growing in the presence of pea cell wall fibre in vitro.

In one embodiment, the increased short chain fatty acid production corresponds to increased IL6 and IL10 production, for example in the gastro-intestinal tract passage of a subject.

In one embodiment, the increased IL6 and IL10 production in the human gastro-intestinal tract passage corresponds to improved anti-inflammatory status. IL6 has a positive effect on the regeneration of the intestinal epithelium and wound healing. IL6 is involved in the induction of cells that have a key role in host defense against extracellular microbes in mucosal tissues.

IL-10 is an anti-inflammatory cytokine, able to suppress several innate and adaptive immune cell types participate to the restoration of immune homeostasis.

Fermenting the said plant fibers with *Bifidobacterium* appears to have a beneficial effect, particularly for Poaceae plant fibres such as corn fibre.

The present invention further relates to a composition comprising an effective amount of a Poaceae and/or Leguminoseae plant fibre and *Bifidobacterium* probiotic, wherein said plant fibre has an insoluble fraction of between 40 to 80% (w/w), and wherein said *Bifidobacterium* probiotic is obtained by a process comprising the steps of
 a. Fermenting the *Bifidobacterium* in a bacterial growth medium; and
 b. Harvesting the cultured *Bifidobacterium* probiotic.

In some embodiments, the plant fibre is a Poaceae plant fibre, for example corn fibre.

In some embodiments, the plant fibre is a Leguminoseae plant fibre, for example pea cell wall fibre.

In one embodiment, the composition is a food, a medical food, a tube feed, or a nutritional supplement.

In one embodiment, the food is selected from milk, yoghurt, curd, cheese, fermented milks, milk based fermented products, rice based products, milk based powders, infant formulae and pet food.

In one embodiment, the composition is a pharmaceutical composition wherein the pharmaceutical composition comprises one or more pharmaceutically acceptable carriers, diluents and/or excipients.

Definitions

As used in this disclosure and the appended claims, the singular forms "a," "an" and "the" include plural referents unless the context clearly dictates otherwise. Thus, for example, reference to "a bacterial strain" or "the bacterial strain" includes two or more bacterial strains.

The words "comprise," "comprises" and "comprising" are to be interpreted inclusively rather than exclusively. Likewise, the terms "include," "including" and "or" should all be construed to be inclusive, unless such a construction is clearly prohibited from the context.

Nevertheless, the compositions disclosed herein may lack any element that is not specifically disclosed. Thus, a disclosure of an embodiment using the term "comprising" includes a disclosure of embodiments "consisting essentially of and "consisting of the components identified. Similarly, the methods disclosed herein may lack any step that is not specifically disclosed herein. Thus, a disclosure of an embodiment using the term "comprising" includes a disclosure of embodiments "consisting essentially of and "consisting of the steps identified.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

Furthermore, all numerical ranges herein should be understood to include all integers, whole or fractions, within the range. The term "between" includes the end points of the identified range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

However, while the term "subject" is often used herein to refer to a human, the present disclosure is not so limited. Accordingly, the terms "individual" and "patient" refer to any animal, mammal that can benefit from the treatment.

As used herein, an "effective amount" is an amount that prevents a deficiency, treats a disorder, condition, or disease in a subject or, more generally, reduces symptoms, manages progression of the diseases or provides a nutritional, physiological, or medical benefit to the subject.

The terms "treatment" and "treating" include any effect that results in the improvement of the condition or disorder, for example lessening/ameliorating, reducing, modulating, or eliminating the condition or disorder. The term does not necessarily imply that a subject is treated until total recovery. Non-limiting examples of "treating" or "treatment of a condition or disorder include: (1) inhibiting the condition or disorder, i.e. arresting the development of the condition or disorder or its clinical symptoms and (2) relieving the condition or disorder, i.e. causing the temporary or permanent regression of the condition or disorder or its clinical symptoms. A treatment can be patient- or doctor-related.

The terms "prevention" or "preventing" mean causing the clinical symptoms of the referenced condition or disorder to not develop or reducing the risk of their development in an individual. The individual may be exposed or predisposed to the condition or disorder but does not yet experience or display symptoms of the condition or disorder. The terms "condition" and "disorder" mean any disease, condition, symptom, or indication.

The relative term "optimize" or "optimise" as used herein mean to improve, increase, or enhance.

The terms "food," "food product" and "food composition" mean a product or composition that is intended for ingestion by an individual such as a human and provides at least one nutrient to the individual. The food product may be, for example, a nutritionally complete formula (for example an infant formula or a clinical nutrition product), a dairy product, a beverage powder, a dehydrated soup, a dietary supplement, a meal replacement, a nutritional bar, a cereal, a confectionery product or a complete and balanced pet food, e.g. dry pet food composition or wet pet food composition.

The term "pet food" or "pet food composition" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. In one aspect, the pet can be a companion animal. As such, the term "cat food composition" means any food composition intended to be ingested by a cat and the term "dog food composition" means any composition intended to be ingested by a dog.

The term "complete and balanced" when referring to a food composition means a food composition that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO).

The term "companion animal" means a dog or a cat.

"Wet pet food" means a pet food having a moisture content from about 50% to about 90%, and in one aspect, from about 70% to about 90%. "Dry pet food" means a pet food having a moisture content less than about 20%, and in one aspect, less than about 15%, and in a specific aspect, less than about 10%. "Semi-moist food" means a pet food having a moisture content from about 20% to about 50%, and in one aspect, from about 25% to about 35%.

In some embodiments, the pet food compositions can comprise a protein. The protein can be crude protein material and may comprise vegetable proteins such as soybean meal, soy protein concentrate, corn gluten meal, wheat gluten, cottonseed, and peanut meal, or animal proteins such as casein, albumin, and meat protein. Examples of meat protein useful herein include beef, pork, lamb, equine, poultry, fish, and mixtures thereof. In one embodiment, the food compositions can comprises the protein in amounts from about 5%, 10%, 15%, 20%, 25%, 30%, 35%, 40%, 45%, 50%, 55%, or even 60% to about 25%, 30%, 35%, 40%, 45%, 50%, 55%, 60%, 65%, or even 70%, including various subranges within these amounts. In one aspect, the protein can be from about 30% to about 55% of the food composition.

In some embodiments, the pet food compositions can comprise carbohydrates. Generally, any type of carbohydrate can be used in the food compositions. Examples of suitable carbohydrates include grains or cereals such as rice, corn, millet, sorghum, alfalfa, barley, soybeans, canola, oats, wheat, rye, triticale and mixtures thereof. The compositions may also optionally comprise other materials such as dried whey and other dairy by-products. In one embodiment, the carbohydrate comprises from about 5% to about 10% of the food composition. In another embodiment, the carbohydrate comprises from about 10% to about 15% of the food compositions. In other aspects, the carbohydrate can be present in amounts from about 5%, 10%, 15%, 20%, 25%, 30%, 35%, or even 40% to about 10%, 15%, 20%, 25%, 30%, 35%, 40%, 45%, or even 50%.

In some embodiments, the pet food compositions can include fat. Examples of suitable fats include animal fats and vegetable fats. In one aspect, the fat source can be an animal fat source such as tallow or poultry fat. Vegetable oils such as corn oil, sunflower oil, safflower oil, grape seed oil, soy bean oil, olive oil and other oils rich in monounsaturated and polyunsaturated fatty acids, may also be used. In one embodiment, the food compositions can comprises the fat in amounts from about 5%, 10%, 15%, 20%, 25%, 30%, or even 35% to about 10%, 15%, 20%, 25%, 30%, 35%, or even 40%, including various subranges within these amounts. In one aspect, the fat comprises from about 25% to about 35% of the food composition.

The administration of the pet food composition can be performed on as-needed basis, an as-desired basis, a regular basis, or intermittent basis. In one aspect, the pet food composition can be administered to the animal on a regular basis. In one aspect, at least weekly administration can be performed. More frequent administration or consumption, such as twice or three times weekly, can be performed in certain embodiments. In one aspect, an administration regimen can comprise at least once daily consumption.

Generally, the pet food composition can be suitable for consumption by an animal, including companion animals such as dogs and cats, as a meal, component of a meal, a snack, supplement, or a treat. Such compositions can include complete foods intended to supply the necessary dietary requirements for an animal. Examples of such food compositions include but are not limited to dry foods, wet foods, semi-moist foods, drinks, bars, frozen prepared foods, shelf prepared foods, and refrigerated prepared foods.

As discussed herein, the pet food compositions may be administered to an animal alone as a complete nutritionally balanced diet, as a supplement, or in conjunction with dietary supplements, vitamins and/or other nutritionally beneficial agents familiar to one of skill in the art, as part of an overall wellness program for the animal. Compositions of the invention may also be useful as a veterinary therapeutic product.

As such, the compositions may optionally contain a carrier, diluent, or an excipient, the suitability of which for the intended use being familiar to one of skill in the art.

The term "prebiotic" means a substrate that is selectively utilized by host microorganisms conferring a health benefit' (Expert consensus document: The International Scientific Association for Probiotics and Prebiotics (ISAPP) consensus statement on the definition and scope of prebiotics, Nature Reviews Gastroenterology & Hepatology, 2017, 14, 491-502).

The term "probiotic" means live microorganisms that, when administered in adequate amounts, confer a health benefit on the host (FAO/WHO, 2002). The microbial cells are generally bacteria or yeasts.

The term "synbiotic" means nutritional compositions or food supplements combining both probiotic(s) and prebiotic(s) and in which the prebiotic(s) selectively favours the probiotic(s) (see DeVrese and Schrezenmeir, Probiotics, prebiotics and synbiotics in food biotechnology, Springer Berlin Heidelberg, pp1-66. The term "synbiotic effect" refers herein to the increase of the advantageous health effect of the synbiotic compared to the effect of the probiotic alone.

The compositions of the present disclosure, including the many embodiments described herein, can comprise, consist of, or consist essentially of the essential elements and limitations described herein, as well as any additional or optional ingredients, components, or limitations described herein or otherwise useful in a diet.

DETAILED DESCRIPTION

Use of *Bifidobacterium*

The invention relates in general to the use of a *Bifidobacterium* probiotic to improve fermentability of a plant fibre.

In one embodiment, it relates to the use of a *Bifidobacterium longum* subsp. *longum* to improve in vivo fermentability of a plant fibre in a human subject.

In particular, the invention relates to the use of a *Bifidobacterium longum* probiotic to improve fermentability of a plant fibre, wherein said plant fibre has an insoluble fraction of greater than 40% (w/w), preferably between 40 to 80% (w/w).

Improvement of plant fibre fermentability with *Bifidobacterium longum* is associated with a reduction of gas formation in the gastro-intestinal tract of a subject, preferably a human subject.

Improvement of plant fibre fermentability also corresponds to increased total short chain fatty acids production in the gastro-intestinal tract of a subject, preferably a human subject. Improvement of plant fibre fermentability may also correspond to reduced gut microbiota proteolytic activity in the gastro-intestinal tract of a subject, preferably a human subject.

The short chain fatty acid may be acetate, or propionate or may be a combination of acetate and propionate.

The increased short chain fatty acid production corresponds to increased IL production in the gastro-intestinal tract passage of a subject. In particular, the increased short chain fatty acids production corresponds to increased IL6 and IL10 production in the gastro-intestinal tract passage of a subject, preferably a human subject. In particular, the increased short chain fatty acid production, particularly acetate and propionate, corresponds to increased IL6 and IL10 production in the gastro-intestinal tract passage of a human subject.

In one embodiment, the increased IL production in the gastro-intestinal tract passage corresponds to improved anti-inflammatory status in a subject. In particular, the increased IL6 and IL10 production in the gastro-intestinal tract passage corresponds to improved anti-inflammatory status in a subject, preferably a human subject.

Method of Improving Fermentability

The invention further relates to a method of improving fermentability of a plant fiber, wherein said method comprises growing *Bifidobacterium longum* in a culture medium, characterised in that said culture medium comprises a Poaceae and/or Leguminoseae plant fiber or a combination thereof. Preferably the *Bifidobacterium longum* is *Bifidobacterium longum* subsp. *longum*.

Composition

The invention further relates to a composition comprising an effective amount of a plant fibre and *Bifidobacterium* probiotic, wherein said plant fibre has an insoluble fraction of between 40 to 80% (w/w).

In particular, the invention relates to a composition comprising an effective amount of a Poaceae and/or Leguminoseae plant fibre and *Bifidobacterium* probiotic, wherein said plant fibre has an insoluble fraction of between 40 to 80% (w/w).

In particular, the invention relates to a composition comprising an effective amount of a Poaceae and/or Leguminoseae plant fibre and *Bifidobacterium* probiotic, wherein said plant fibre has an insoluble fraction of between 40 to 80% (w/w).

In particular, the invention relates to a composition comprising an effective amount of a Poaceae and/or Leguminoseae plant fibre and *Bifidobacterium* probiotic, wherein said plant fibre has an insoluble fraction of between 40 to 80%

(w/w), and wherein said *Bifidobacterium* probiotic is obtained by a process comprising the steps of
  a. Fermenting the *Bifidobacterium* probiotic in a bacterial growth medium; and
  b. Harvesting the cultured *Bifidobacterium* probiotic.

In one embodiment, the bacterial growth medium comprises Poaceae and/or Leguminoseae plant fiber.

The composition of the present invention may be in the form of a food, a medical food, a tube feed, a nutritional composition, or a nutritional supplement. The term "nutritional supplement" refers to a product which is intended to supplement the general diet of a subject.

In one embodiment, the food is selected from milk, yoghurt, curd, cheese, fermented milks, milk based fermented products, rice based products, milk based powders, infant formulae and pet food.

The composition may be in the form of a medical food. The term "medical food" as used herein refers to a food product specifically formulated for the dietary management of a medical disease or condition. The medical food may be administered under medical supervision. The medical food may be for oral ingestion or tube feeding.

The composition may be in the form of a tube feed. The term "tube feed" refers to a product which is intended for introducing nutrients directly into the gastrointestinal tract of a subject by a feeding tube. A tube feed may be administered by, for example, a feeding tube placed through the nose of a subject (such as nasogastric, nasoduodenal, and nasojejunal tubes), or a feeding tube placed directly into the abdomen of a subject (such as gastrostomy, gastrojejunostomy, or jejunostomy feeding tube).

The composition may in the form of a pharmaceutical composition and may comprise one or more suitable pharmaceutically acceptable carriers, diluents and/or excipients.

Examples of such suitable excipients for compositions described herein may be found in the "Handbook of Pharmaceutical Excipients", 2nd Edition, (1994), Edited by A Wade and PJ Weller.

Acceptable carriers or diluents for therapeutic use are well known in the pharmaceutical art, and are described, for example, in "Remington's Pharmaceutical Sciences", Mack Publishing Co. (A. R. Gennaro edit. 1985).

Examples of suitable carriers include lactose, starch, glucose, methyl cellulose, magnesium stearate, mannitol, sorbitol and the like. Examples of suitable diluents include ethanol, glycerol and water.

The choice of pharmaceutical carrier, excipient or diluent can be selected with regard to the intended route of administration and standard pharmaceutical practice. The pharmaceutical compositions may comprise as, or in addition to, the carrier, excipient or diluent any suitable binder(s), lubricant(s), suspending agent(s), coating agent(s) and/or solubilising agent(s).

Examples of suitable binders include starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol. Examples of suitable lubricants include sodium oleate, sodium stearate, magnesium stearate, sodium benzoate, sodium acetate, sodium chloride and the like.

Preservatives, stabilisers, dyes and even flavouring agents may be provided in the composition. Examples of preservatives include sodium benzoate, sorbic acid and esters of p hydroxybenzoic acid. Antioxidants and suspending agents may be also used.

Nutritionally acceptable carriers, diluents and excipients include those suitable for human or animal consumption that are used as standard in the food industry. Typical nutritionally acceptable carriers, diluents and excipients will be familiar to the skilled person in the art.

The composition may be in the form of a tablet, dragee, lozenges, capsule, gel cap, powder, granule, solution, emulsion, suspension, coated particle, spray-dried particle or pill.

It is clear to those skilled in the art that an ideal dose will depend on the subject to be treated, its health condition, sex, age, or weight, for example, and the route of administration. The dose to be ideally used will consequently vary but can be determined easily by those of skill in the art.

However, generally, it is preferred if the composition of the present invention comprises between $10^6$ and $10^{10}$ cfu and/or between $10^6$ and $10^{10}$ cells of *Bifidobacterium longum* subsp *longum* per daily dose. It may also comprise between $10^6$ and $10^{11}$ cfu and/or between $10^6$ and $10^{11}$ cells of *Bifidobacterium longum* subsp *longum* per g of the dry weight of the composition.

Poaceae Plant Fibre

Poaceae plant fibre may be derived from Corn, Barley, Oats, Rice, Rye, Sorghum, Wheat, or Millet. Preferably, the plant fibre is derived from Corn. The plant fibre may be produced as a byproduct of milling, for example in the form of a fibre mix.

When the plant fibre is a Poaceae fibre, the insoluble fraction is preferably between 70 to 80% (w/w).

The corn fibre may be in the form of a corn fibre mix. The mix may comprise between to 60% (w/w), or 35 to 55% (w/w), or 40 to 50% (w/w), or about 45% (w/w) dietary fibre; and/or between 20 to 50% (w/w), or 30 to 40% (w/w), or about 33% (w/w) corn bran; and/or between 1 to 10% (w/w) wheat flour, preferably whole grain wheat flour, preferably about 5.3% (w/w) whole grain wheat flour; and/or between 1 to 10% (w/w) dextrin, preferably resistant dextrin, preferably about 5% resistant dextrin; and/or between 1 to 5% (w/w) gum, preferably guar gum, preferably about 0.8% guar gum; and/or between 1 to 5% (w/w) carboxymethylcellulose, preferably about 0.5% (w/w) carboxymethylcellulose.

In some embodiments, the Poaceae fibre comprises corn fibre, preferably about 45% (w/w) corn fibre. In some embodiments, said Poaceae fibre further comprises about 5% (w/w) resistant dextrin, about 2.5% (w/w) wheat bran, about 1% (w/w) guar gum and about 0.5% (w/w) carboxymethylcellulose.

The *Bifidobacterium* probiotic may be pre-conditioned with the Poaceae plant fibre. For example, *B. longum* NCC 3001 may be pre-conditioned by growing in the presence of corn fibre.

Leguminoseae Plant Fibre

The plant fibre may be a Leguminoseae fibre. When the plant fibre is a Leguminoseae fibre, the insoluble fraction is preferably between 40 to 50% (w/w). Leguminoseae include a number of important agricultural and food plants, including *Pisum sativum* (pea), *Glycine max* (soybean), *Phaseolus* (beans), *Cicer* arietinurn (chickpeas), *Medicago sativa* (alfalfa), *Arachis hypogaea* (peanut), *Ceratonia siliqua* (carob), and *Glycyrrhiza glabra* (liquorice). Preferably, the Leguminoseae fibre is pea fibre. Preferably the pea fibre is pea cell wall fibre.

The *Bifidobacterium* probiotic may be pre-conditioned with the Leguminoseae plant fibre. For example, *B. longum* NCC 3001 may be pre-conditioned by growing in the presence of pea cell wall fibre.

*Bifidobacterium* Probiotic

The *Bifidobacterium* probiotic of the invention may be *Bifidobacterium longum*, *Bifidobacterium animalis* ssp. *lactis*, or *Bifidobacterium breve*. Most preferably, it is *Bifidobacterium longum*, for example *B. longum* subsp. *longum*, *B. longum* subsp. *infantis*, or *B. longum* subsp. *suis*, preferably *B. longum* subsp. *longum*. The *B. longum* subsp. *longum* can be selected from *Bifidobacterium longum* ATCC BAA-999, *Bifidobacterium longum* ATCC 15707, and *Bifidobacterium longum* CNCM I-2618. Most preferably, it is *Bifidobacterium longum* ATCC BAA-999 (NC3001).

*B. longum* ATCC BAA-999 is also known as NCC 3001 and may be obtained commercially from specialist suppliers, for example from Morinaga Milk Industry Co. Ltd. of Japan. under the trademark BB536. The term "*B. longum* ATCC BAA-999" includes the bacterium, parts of the bacterium, and/or a growth medium fermented by the bacterium.

*B. longum* ATCC BAA-999 was deposited and is publicly available in ATCC's general bacteriology collection by Tomoko Yaeshima, Morinaga Milk Industry Co. Ltd, Higashihara, Zama-City, Kanagawa-pref., Japan, on Jun. 7, 2004 at AMERICAN TYPE CULTURE COLLECTION, 10801 University Boulevard, Manassas, Virginia 20110-2209.

The *B. longum* ATCC BAA-999 may be cultured according to any suitable method. *B. longum* ATCC BAA-999 may be added to a composition in any technically feasible form e.g. a freeze-dried or spray-dried form.

Strain ATCC 15707 was deposited prior to 1990 and is commercially available. Strain CNCM I-2618 was deposited by Nestec S.A., avenue Nestle 55, 1800 Vevey, Switzerland on Jan. 29, 2001. Since then, Nestec S.A. has merged into Sociate des Produits Nestle S.A. Accordingly, Societe des Produits Nestle S.A. is the successor in title of Nestec S.A., under article 2(ix) of the Budapest Treaty.

ATCC refers to American Type Culture Collection, 10801 University Blvd., Manassas, Virginia 20110-2209, U.S.A. CNCM refers to Collection nationale de cultures de microorganismes, Institut Pasteur, 28, rue du Dr Roux, F-75724 Paris Cedex 15, France.

The *Bifidobacterium* probiotic of the invention is a live probiotic bacteria. Bacteria are considered as "live" when they are able to multiply under controlled culture conditions and form colonies or suspensions or when the microorganism metabolic activity and/or membrane integrity can be established using methods known to the person skilled in the art, such as for example flow cytometry.

Food Product

The invention further relates to a food product comprising the composition as herein described. The food product may be a cereal bar, biscuit, yoghurt, powdered beverage, or the like.

Use as a Medical Food

The invention further relates to a composition or a food product as herein described, for use as a medical food to prevent or treat a condition or disease in a subject. In some embodiments, said composition is for use as a medical food for weight management, irritable bowel syndrome, chronic enteropathy, and/or atopic dermatitis in a subject. In some embodiments, said composition is for use as a medical food for irritable bowel syndrome, or chronic enteropathy in a subject. In some embodiments, the medical food is to prevent or treat irritable bowel syndrome. In some embodiments, the medical food is to prevent or treat chronic enteropathy. In some embodiments, the medical food is to prevent or treat atopic dermatitis. In some embodiments, the medical food is to prevent or treat inflammation. In some embodiments, the medical food is to prevent or treat colon cancer.

EXAMPLES

Example 1: Upper GIT Simulation and Short Term Colonic Incubations

The strain *B. longum* subsp. *longum* NCC3001, also called BL999, was used in this in vitro study. A total amount of 2.0E8 CFU was fed in the system. Pea cell wall fibre (obtained from a commercial source) and corn fibre mix (also known as Fibre1, obtained from CPW Breakfast Cereals) were used as fibres and a concentration of 22 g/L of each was fed in the system. Corn fibre mix (Fiber1) contains 45% dietary fibre, and comprises 33.5% corn bran, 5.3% whole grain wheat flour, 5% resistant dextrin and 0.8% guar gum. Every synbiotic couple and the probiotic and prebiotics constituents alone were tested in three biological replicates.

An adapted SHIME® system was used to investigate the survivability of probiotics in upper GIT (stomach and small intestine). The study was performed using a protocol that was adapted from the InfoGest consensus method and the dynamic pH profile for in vivo upper GIT study. One reactor was first subjected to stomach conditions and subsequently small intestinal conditions, mimicking both fed and fasted conditions (FIG. 1).

Figure 2:
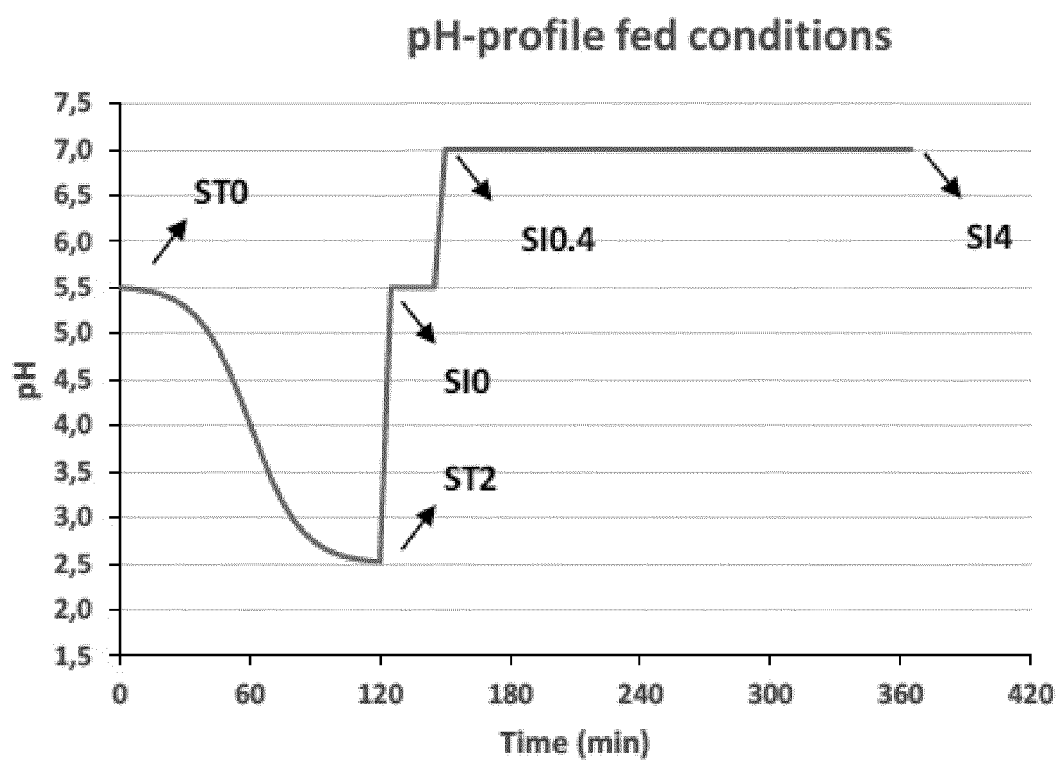
FIG. 2: pH profile of an incubation mimicking upper GIT passage conditions. Samples were taken at the start of the stomach incubation (ST0), the end of the stomach incubation (ST2), the start of the small intestinal incubation (SI0), the start of the absorption phase in the small intestinal incubation (S10.4) and the end of the small intestinal incubation (S14).

Incubation started by feeding the probiotics and prebiotics samples of this study with 7 g/L fructose for 2 hours at 37° C. with mixing, where pH decreased from 5.5 to 2.5 (FIG. 2). A specific gastric suspension (Pepsin, phosphatidylcholine, fructose and additional nutritional medium) was then added to simulate the stomach stage. After 5 minutes, a standardized pancreatic juice containing pancreatin from porcine pancreas and 10 mM bovine bile extract was added to simulate duodenal stage. After 20 minutes, the reactor contents were transferred to a dialysis membrane (regenerated cellulose, 3.5 kDa) which was submerged in a solution containing the same bicarbonate concentration as the content of the membrane, 4 times the volume, and at pH 7. Dialysis was performed for 3.67 hours to simulate jejunal and ileal incubation.

Short-term colonic incubations for gut microbial metabolic analysis were performed using a representative colon medium containing host-derived and diet-derived compounds and a colonic microbiota of a single healthy human adult donor. Upper GIT suspension (containing non-absorbed fraction of fructose) was administered to the colonic incubations, in three biological replicates, without additional fermentable carbohydrates, except for samples with prebiotic fibres. As control, upper GIT suspension containing only the non-absorbed fraction of fructose (no probiotic or prebiotic added) in the gastric juice was administered. Incubations were performed at 37° C. anaerobically for 48 hours at pH 6.5.

Example 2: Improvement of Short Chain Fatty Acid Production

After 48 hours of colonic incubations, short chain fatty acids (SCFA) produced by the microbiota were measured using gas chromatography with flame ionization detection (GC-FID).

Figure 3:
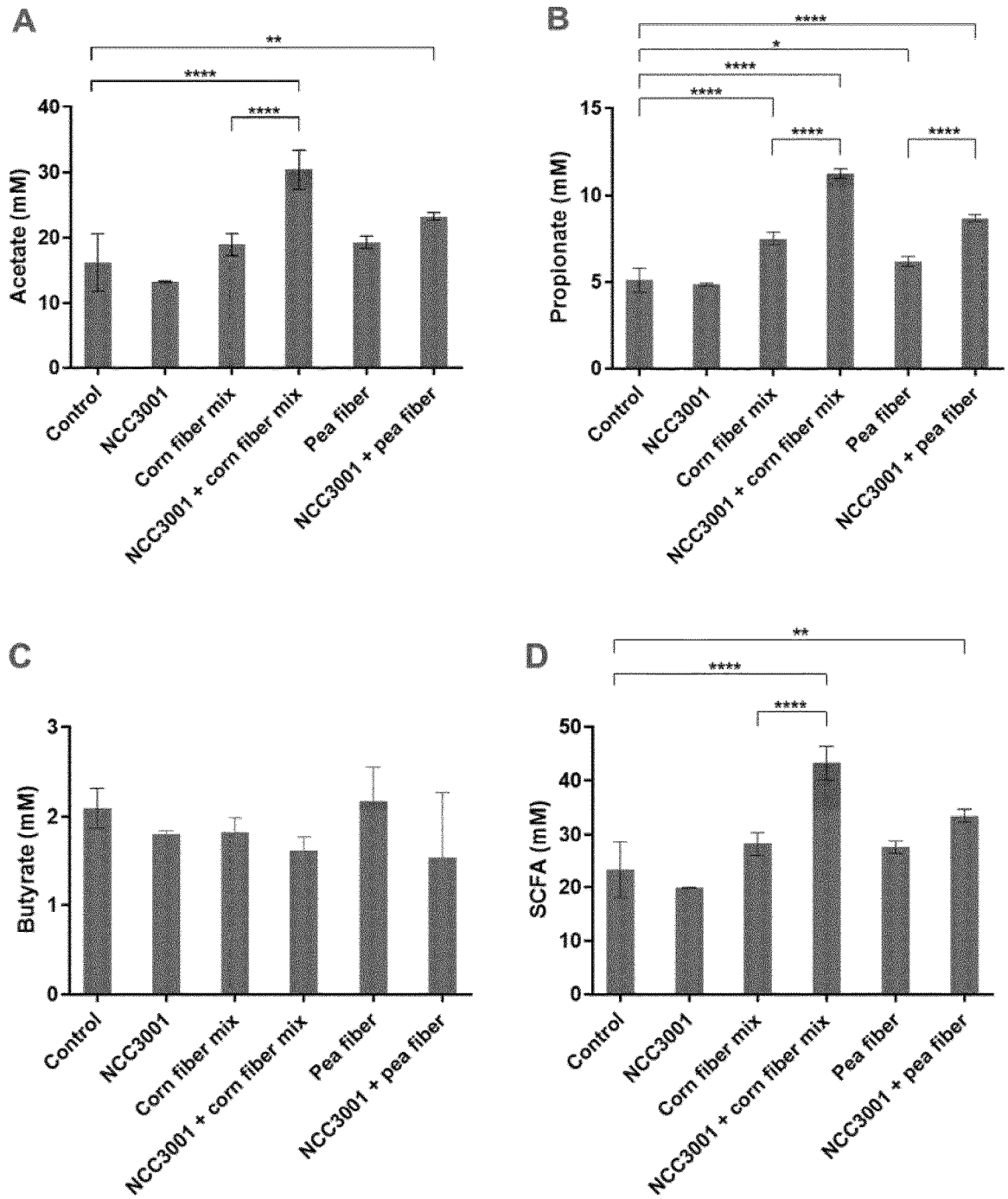
FIG. 3: Average change in concentration (mM) of (A) acetate, (B) propionate, (C) butyrate and (D) total SCFAs during 48 hours of colonic incubations. (*), (), (*), and (****) represent statistically significant differences between the samples indicated by the connecting line, with $p<0.05$, $p<0.01$, $p<0.001$, and $p<0.0001$, respectively.

An increase of acetate production was observed when NCC 3001 was administered together with a prebiotic fibre, especially corn bran mix (FIG. 3A). It is not clear if the acetate production is attributed to NCC 3001 itself or to the other member of the microbiota present in the system. *B. longum* could produce high amounts of acetate in presence of complex fibre through the bifid shunt. Overall, high acetate concentration could indicate an increased metabolic activity of *B. longum* when co-supplemented with corn bran mix, but also an increased utilization of the fibre by the probiotic and other colonic microbiota members.

The production of propionate also increased in incubations with the synbiotics compared to that with the fibres alone (FIG. 3B). Additionally, pre-conditioning NCC3001 with pea fibre also resulted in a significantly higher propionate production than that without pre-conditioning (data not shown). As *B. longum* does not produce propionate, the result indicates an increase of metabolic activity of other colonic bacteria and an increased utilization of the corn fibre mix or pea fibre, finally producing propionate through cross-feeding interactions. The increase of acetate and propionate is reflected also in the change of total SCFAs concentration, where the synbiotic formulations improved SCFAs production, especially when corn bran mix is co-supplemented with NCC3001 (FIG. 3D).

Example 3: Improvement of Fibre Tolerability

Figure 4:
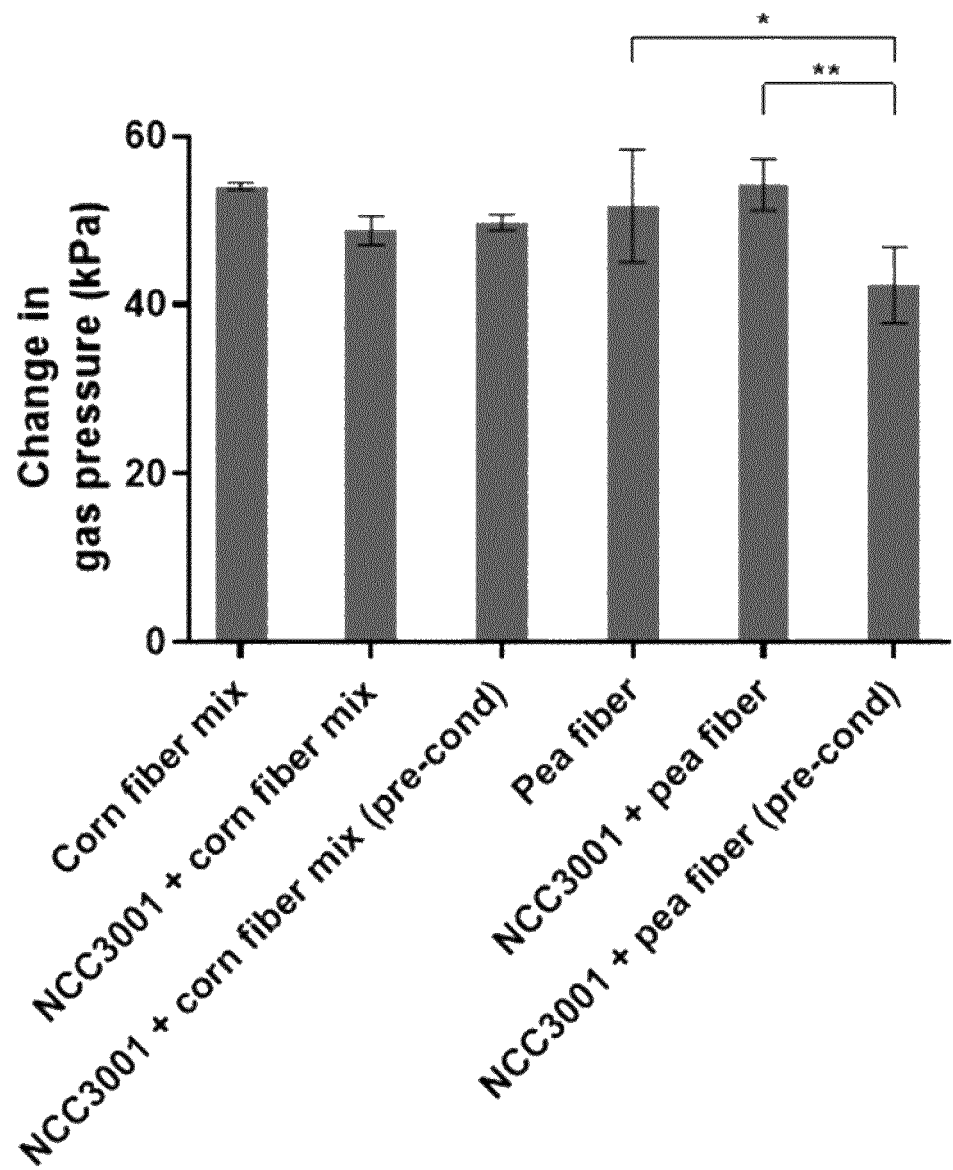
FIG. 4: Average change in gas pressure in the headspace during 0-48 h of colonic incubations. (*), (), (*), and (****) represent statistically significant differences between the samples indicated by the connecting line, with $p<0.05$, $p<0.01$, $p<0.001$, and $p<0.0001$, respectively.

Consumption of dietary fibres that are poorly digested by the human body often promotes an increase of gas production by colonic microbiota, leading to bloating and flatulences. In this study, change in gas pressure in the headspace of the colonic incubations was recorded between 0-48 hours. Co-supplementation of corn fibre mix with NCC 3001 resulted to a potential decrease of gas pressure, although not statistically significantly different from the gas pressure of the incubation with corn fibre mix alone (FIG. 4). Co-supplementation of pea fibre with pre-conditioned NCC3001 resulted to a significant decrease of gas production in the colonic incubation, indicating an increased tolerability of pea fibre.

Example 4: Decrease of Proteolytic Fermentation with Pea Fibre

Figure 5:
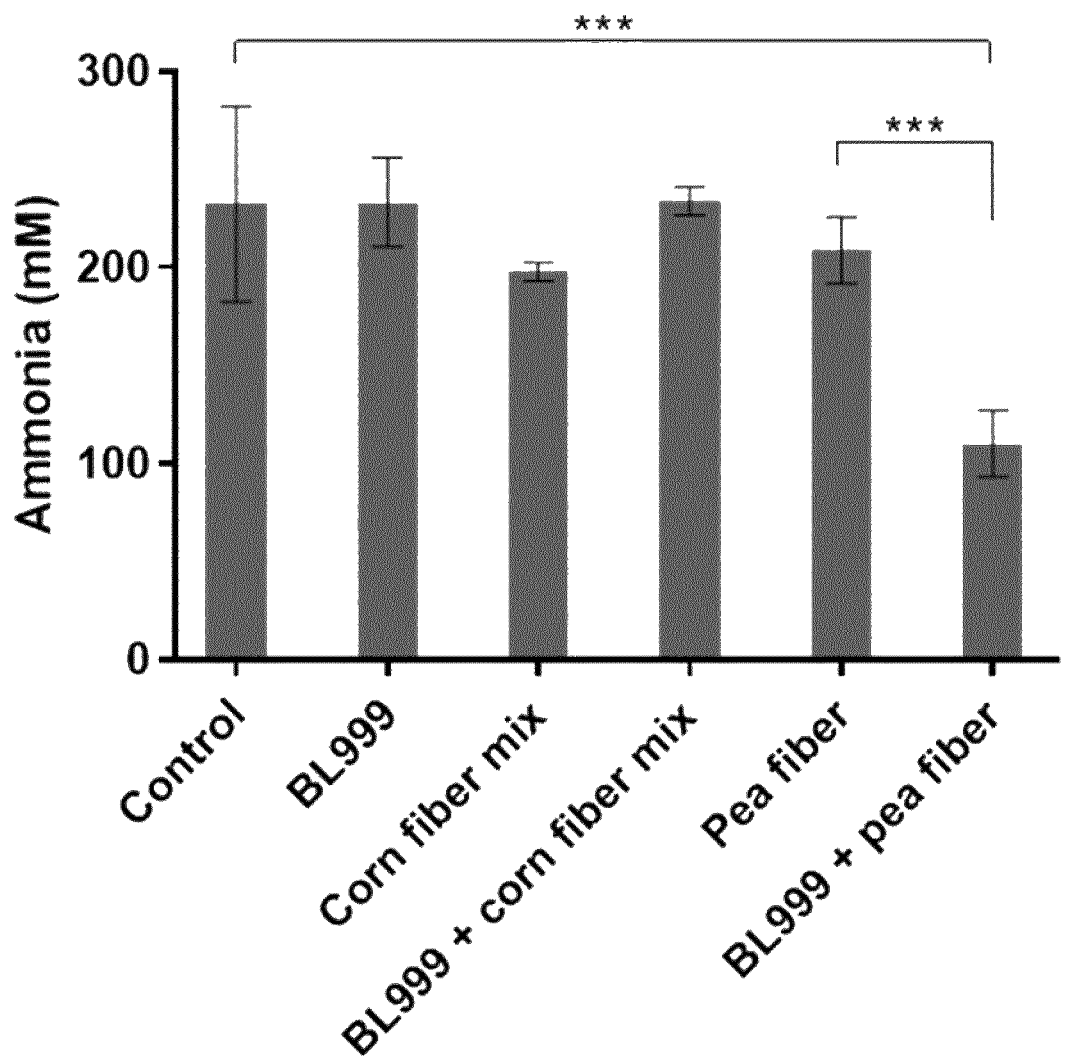
FIG. 5: Average change in concentration (mM) of ammonia during 48 hours of colonic incubations. (*), (), (*), and (****) represent statistically significant differences between the samples indicated by the connecting line, with $p<0.05$, $p<0.01$, $p<0.001$, and $p<0.0001$, respectively.

Quantification of ammonium production at the end of the colonic incubations is an indicator of the overall proteolytic fermentation undergoing in the system. Statistically significantly less ammonium was produced when NCC 3001 was co-supplemented with pea fibre as compared to the experiments performed with pea fibre alone or with the corn bran mix (FIG. 5). This could imply the presence of a synergistic effect on the decrease in proteolytic fermentation upon dosing of *B. longum* together with pea fibre.

Figure 6A:
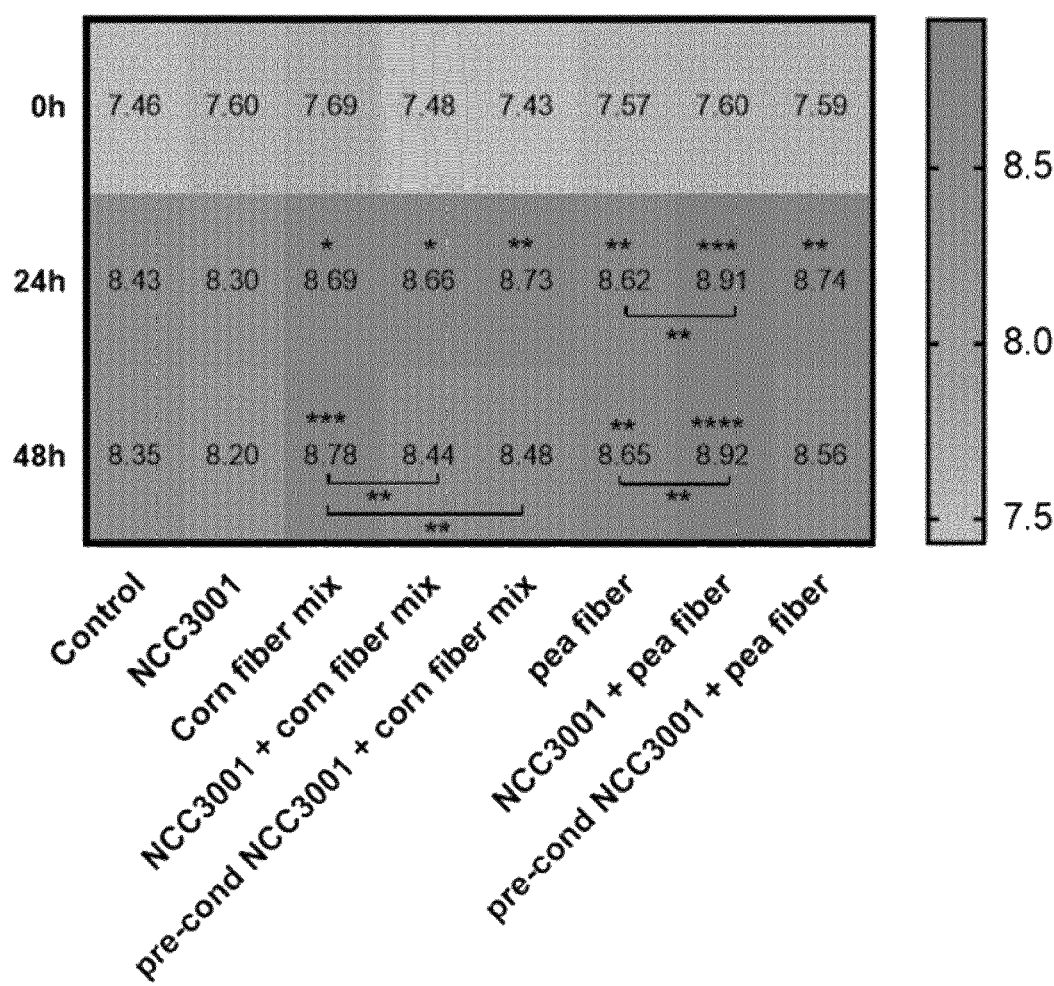
FIG. 6: Average absolute levels (log counts/mL) of (A) Bifidobacteriaceae family, (B) OTU6 related to *Bifidobacterium longum*, (C) OTU3 related to *Bifidobacterium pseudocatenulatum* and (D) OTU8 related to *Bifidobacterium bifidum*, at 48 h of colonic incubation. The intensity of shading correlates with the absolute abundance. (*), (), (*), and (****) represent statistically significant differences between the samples indicated by the connecting line, while (*), (), (*), and (****) without connecting line represent statistically significant differences between the samples with the control, with $p<0.05$, $p<0.01$, $p<0.001$, and $p<0.0001$, respectively.
Figure 6B:
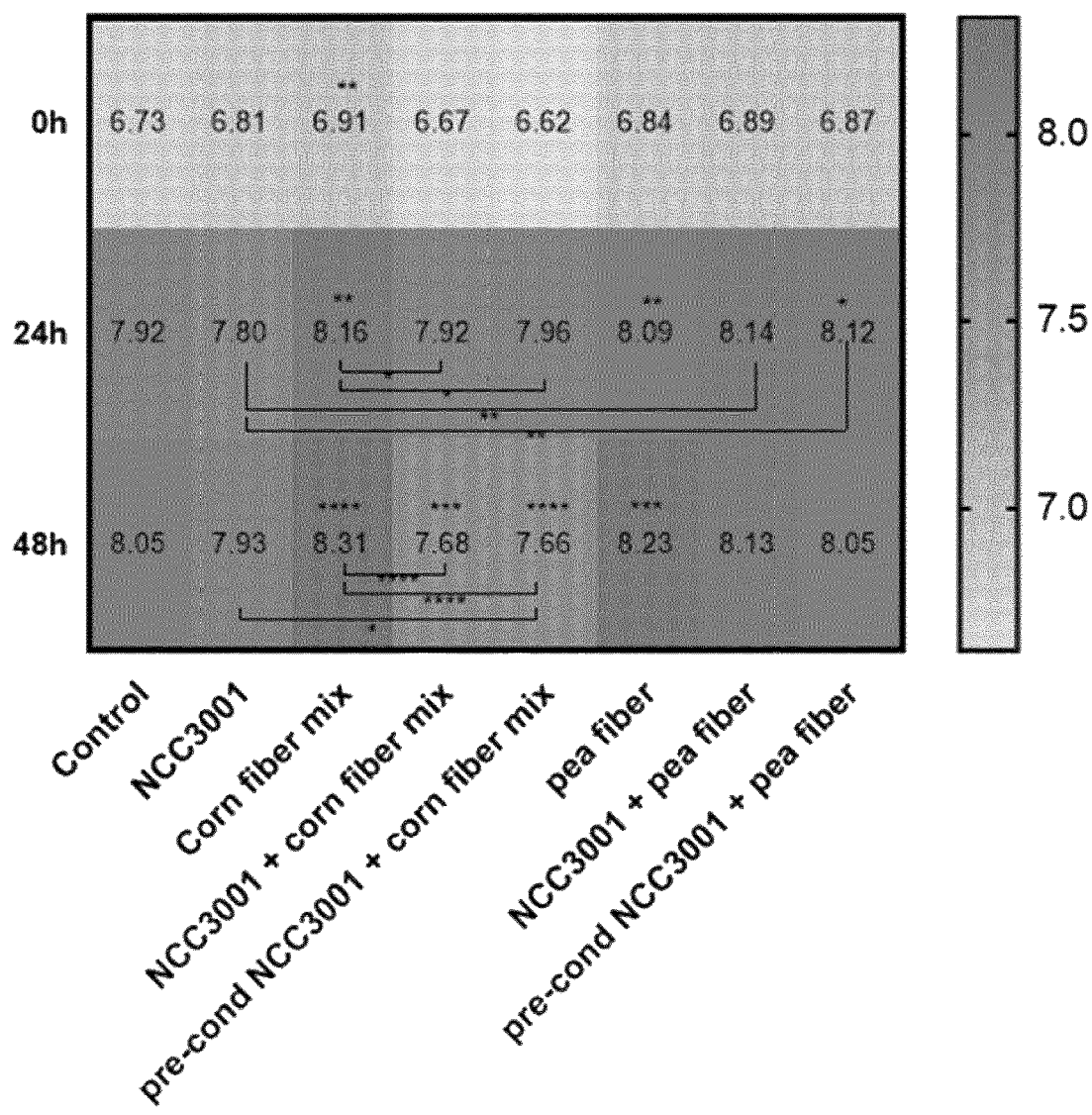
Figure 6C:
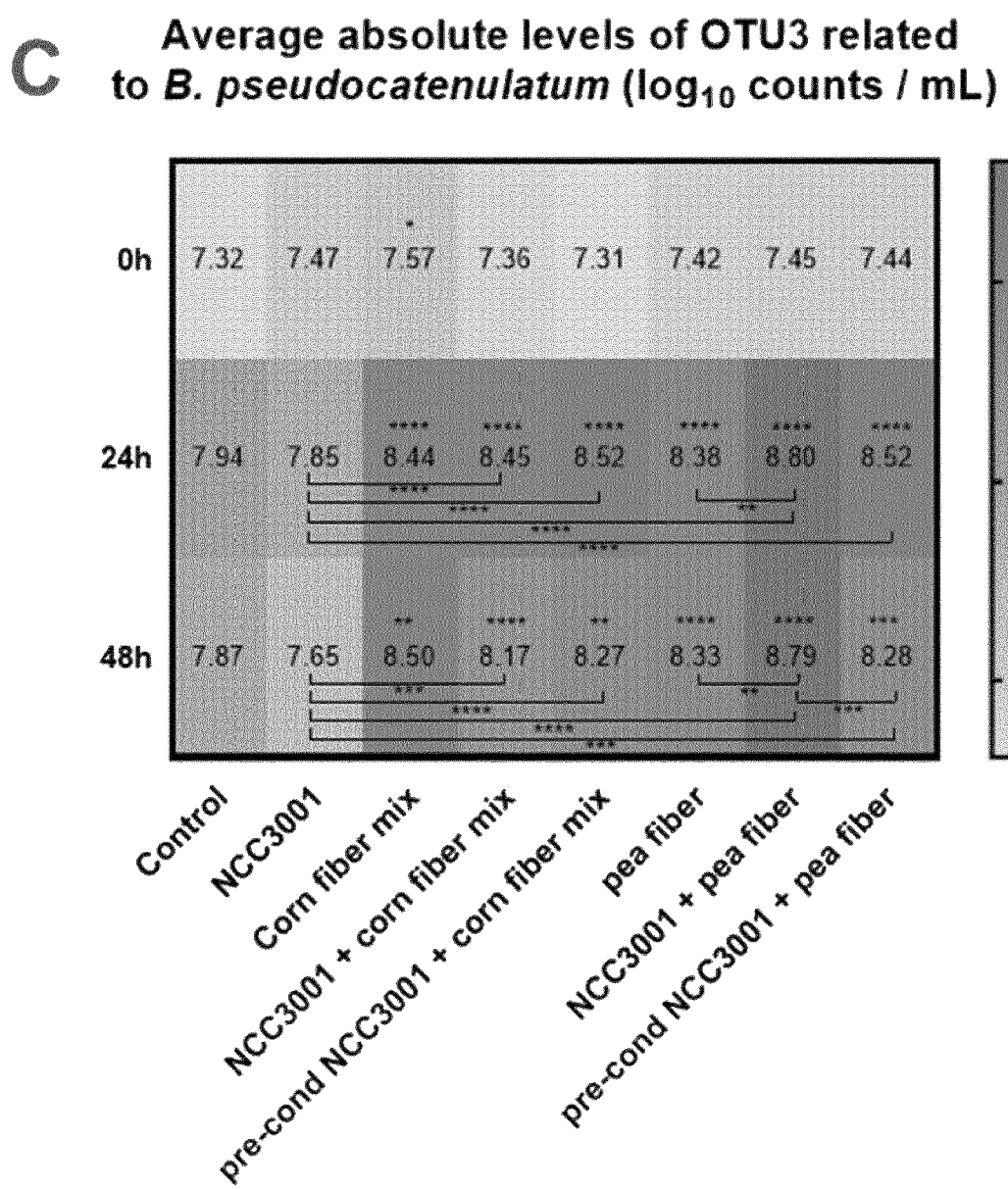
Figure 6D:
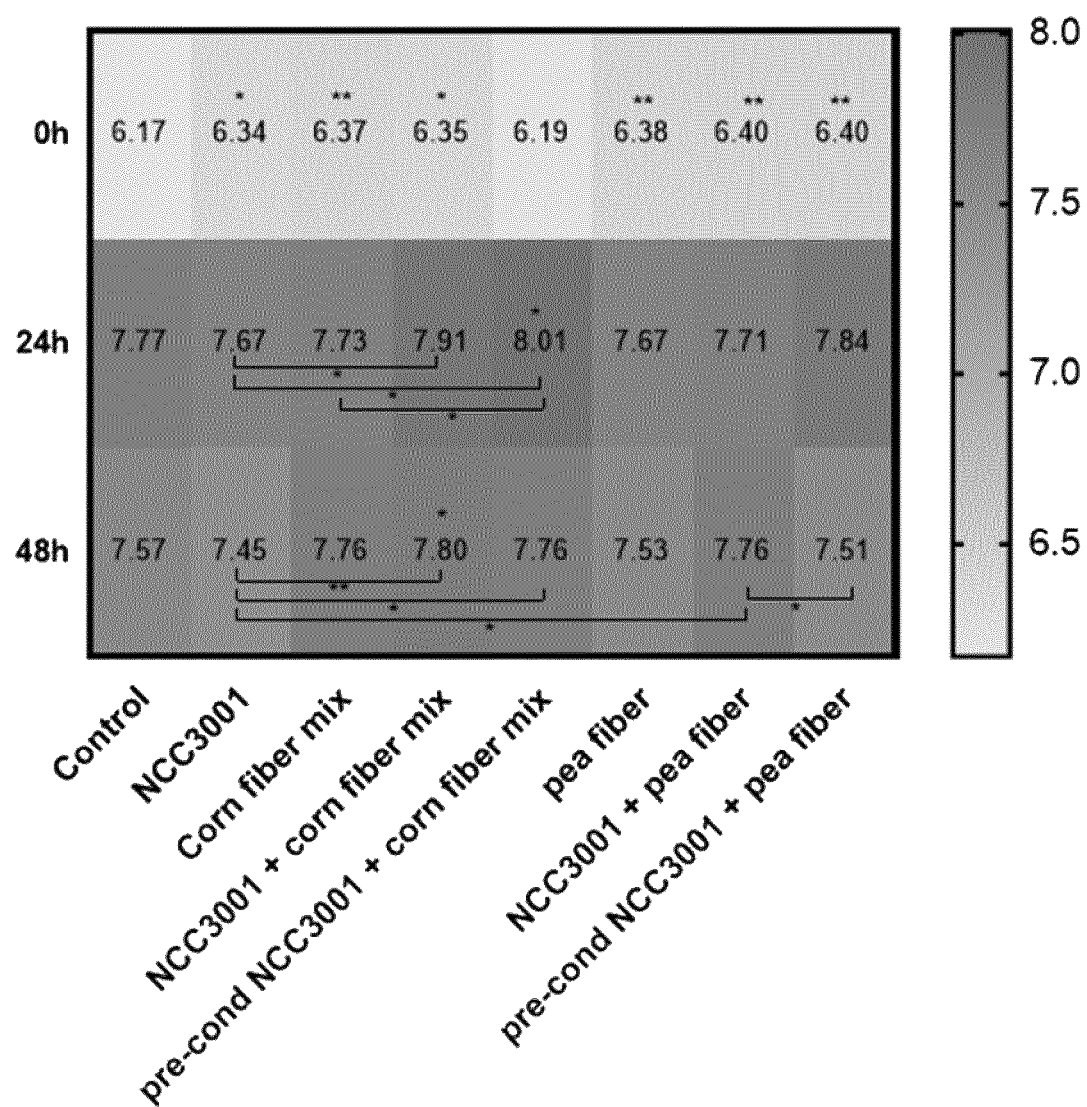

Colonic microbiota was determined, using live/dead flow cytometry coupled to microbiome profiling using 16S-targeted Illumina18. Live/dead flow cytometry was performed on a BDFacs verse by preparing samples in a ten-fold dilution series in phosphate buffered saline. Assessment of viable, non-viable and total cell count in culture sample was done by staining with SYTO 24 and propidium iodide. Growth of Bifidobacteriaceae family was induced after 48 h of colonic incubation (FIG. 6A), particularly when pea fibre was supplemented with NCC 3001. This increase is not only due to the increased presence of NCC 3001 and other *B. longum* subspecies (FIG. 6B), but as well to the increased presence of *B. pseudocatenulatum* (FIG. 6C) (a key acetate producer), and increase in *B. bifidum* (FIG. 6D).

The strong stimulation of propionate production observed previously (FIG. 3B) could potentially be attributed to the stimulation of OTU4 related to Phascolarctobacterium succinatutens of the Firmicutes phylum, a known succinate-converting, propionate-producing gut microbe. Succinate could have been derived from Bacteroidetes species, including OTU2 related to *Bacteroides* thetaiotaomicron, OTU5 related *Bacteroides* stercoris and OTU12 related to Bateroides vulgatus (Table 1).

Testing of previously selected mixes of *B. longum* NCC 3001 with corn bran mix (Fibre1) or pea fibre in an advanced simulated gastro-intestinal tract system (SHIME®) demonstrated a synbiotic behavior. Results showed an increase of NCC 3001 survivability and metabolic activity during upper GIT incubations when supplemented with the fibres. During colonic incubations, supplementation of the both the probiotic and the prebiotic increased SCFA production, especially acetate and propionate, compared to the administration of the fibres alone. Moreover, colonic incubation of pre-conditioned NCC 3001 with pea fibre decreased overall gas pressure, indicating an increase tolerability of the fibre. The synbiotic NCC3001 and pea fibre also significantly induced an increase of abundance of several species from the Bifidobacteriaceae, Bacteroidaceae and Acidaminococcaceae families. A long-term SHIME study is planned to validate probiotic survivability and health benefits after 4 weeks of GIT incubation with daily supplementation of the probiotics. Additionally, specific quantifications of *B. longum* subsp. *longum* NCC3001 in the colonic cultures are currently being analysed by qPCR in order to identify the specific quantity of this strain relative to the total Bifidobacteria OTUs and thus confirm the survivability of the probiotic in the colon.

Example 5: Evaluation of the Effect of Pro- and Symbiotic Products on Inflammation after Passage Through the Complete GIT Using the SHIME® Technology The effect of *Bifidobacterium longum* and its synbiotic combinations (with or without preconditioning) upon colonic fermentation on gut-wall functioning was investigated in terms of modulation of a 'leaky gut' under inflammatory conditions. *B. longum* was formulated together with a mixture of fibers and pea fiber. The endpoints were related to immune markers (pro- and anti-inflammatory cytokines and chemokines) in an in vitro Caco-2/THP1 co-culture model. Colonic samples were selected from a phase 1 study which allowed to evaluate the effects induced by the products and their fermentation-derived metabolites produced by the gut microbiota.

After 24 h of apical pre-treatment of Caco-2/THP1-Blue™ co-cultures with colonic batch samples, the basolateral supernatant was discarded and the cells were stimulated with LPS. After 6 h of stimulation, the basolateral supernatant was collected to measure cytokines and chemokines secreted in the medium.

Figure 7:
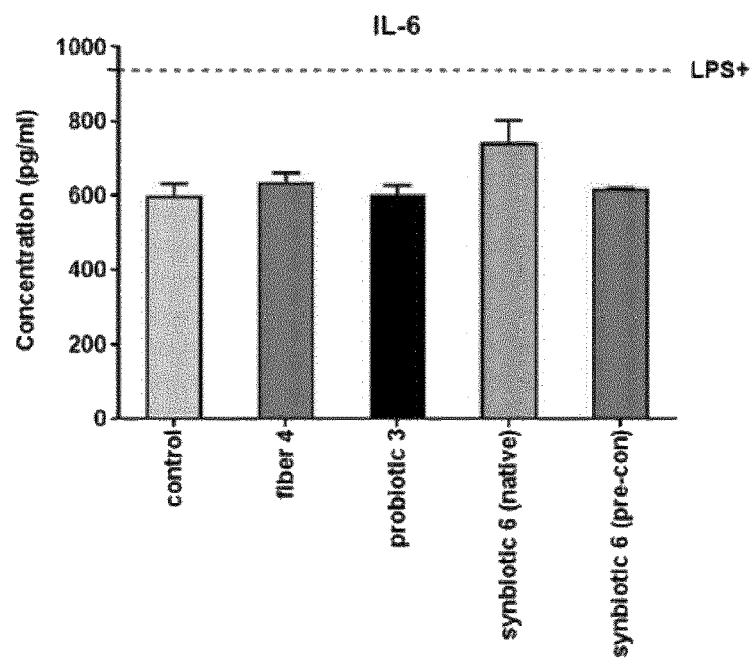
FIG. 7: Effect of colonic batch samples on secretion of (A) IL6 and (B) IL10. Cytokine levels were measured 6 h after LPS treatment on the basolateral side of the Caco-2/THP1-Blue™ co-cultures after pre-treatment of the apical side for 24 h with colonic batch samples. The red dotted line corresponds to the experimental control LPS+. Data are plotted as mean±SEM. (*) represents statistically significant differences between the treatment and control samples or between indicated treatments. (*)=$p<0.05$; (**)=$p<0.01$. (A) effect on cytokine production of probiotic 3 as synbiotics. Fiber 3=mixture of fibers (Fiber1, as herein described), fiber 4=pea fiber; probiotic 3=*B. longum*; synbiotic 5=fiber 3+probiotic 3; synbiotic 6=fiber 4+probiotic 3.
Figure 7:
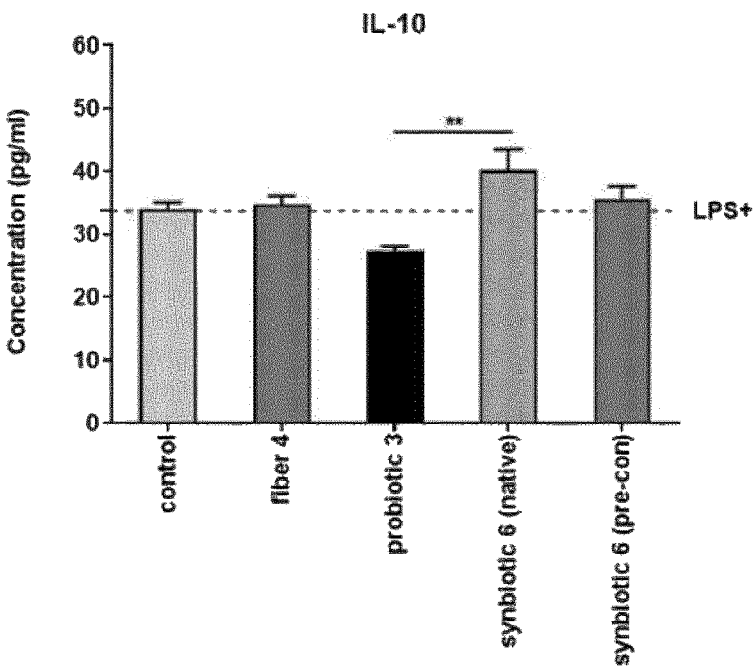
Figure 8:
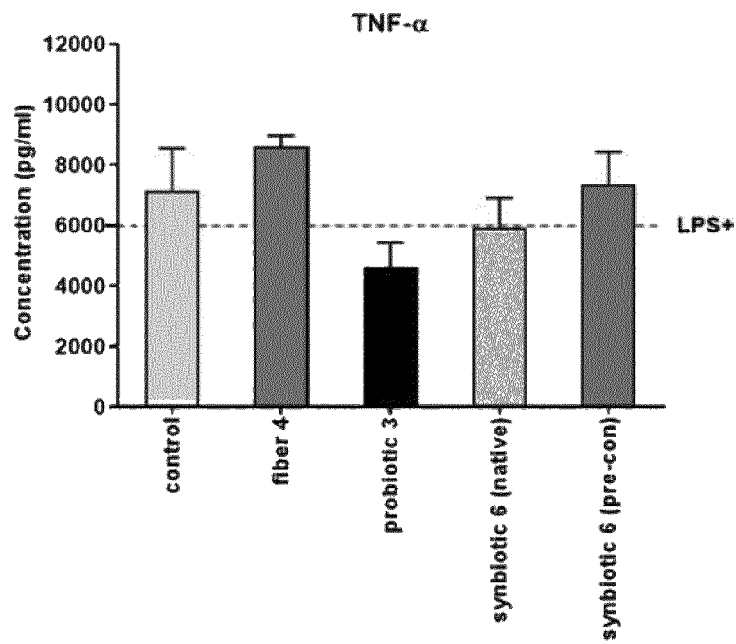
FIG. 8: Effect of colonic batch samples on secretion of (A) TNF-α and (B) IL8. Cytokine levels were measured 6 h after LPS treatment on the basolateral side of the Caco-2/THP1-Blue™ co-cultures after pre-treatment of the apical side for 24 h with colonic batch samples. The red dotted line corresponds to the experimental control LPS+. Data are plotted as mean±SEM. (*) represents statistically significant differences between the treatment and control samples or between indicated treatments. (*)=$p<0.05$; (**)=$p<0.01$. (A) effect on cytokine production of probiotic 3 as synbiotics. Fiber 3=mixture of fibers (Fibre1, as herein described), fiber 4=pea fiber; probiotic 3=*B. longum*; synbiotic 5=fiber 3+probiotic 3; synbiotic 6=fiber 4+probiotic 3.
Figure 8:
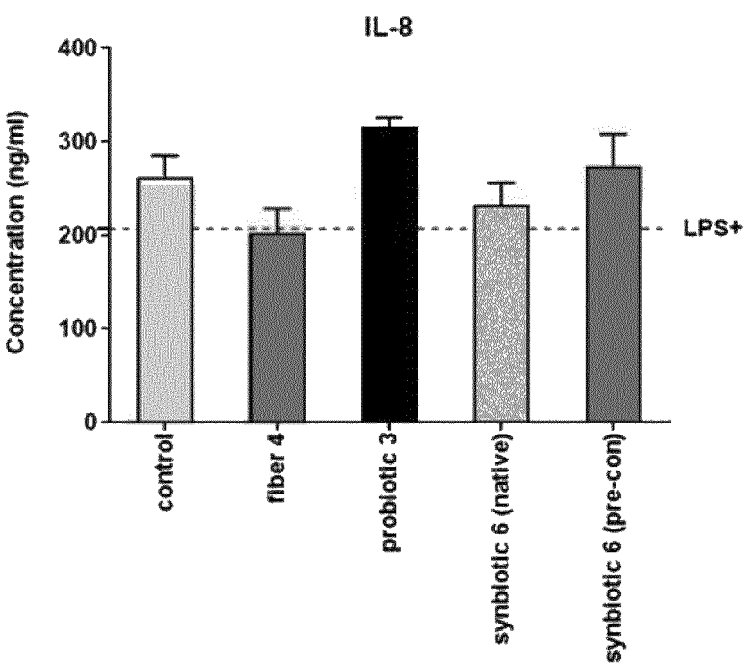

Synbiotic 6 (pea fiber+*B. longum*), under native conditions, tended to increase the IL-6 secretion compared to treatment with fiber 4 (pea fiber) or probiotic 3 (*B. longum*) (FIG. 7A). Native synbiotic 6 significantly increased the IL-10 secretion compared to probiotic 3 (FIG. 7B). The levels also tended to be higher compared to their respective fibers. Synbiotic 6 decreased the secretion of TNF-α compared to treatment with fiber 4 (FIG. 8A). Native synbiotic 6 tended to decrease IL-8 secretion compared to probiotic treatment alone; however, levels were still increased compared to treatment with fiber 4 alone (FIG. 8B).

The invention claimed is:

1. A method of improving fermentability of a plant fiber, wherein said method comprises growing *Bifidobacterium longum* NCC 3001 in a culture medium, wherein said culture medium comprises a Poaceae plant fiber, wherein the Poaceae fibre comprises corn fiber.

2. Method according to claim 1, wherein said plant fibre has an insoluble fraction of between 40 to 80% (w/w).

3. Method according to claim 1, wherein the plant fibre is a Poaceae fibre, with an insoluble fraction of between 70-80% (w/w) of total plant fibre.

4. Method according to claim 1, wherein improvement of plant fibre fermentability corresponds to
   a. reduced gas formation in the gastro-intestinal tract of a subject; and
   b. increased total short chain fatty acid production in the gastro-intestinal tract of a subject.

5. Method according to claim 4, wherein the short chain fatty acid is acetate and/or propionate.

6. Method according to claim 4, wherein the increased short chain fatty acid production, corresponds to increased IL6 and IL10 production in the gastro-intestinal tract passage.

7. Method according to claim 6, wherein the increased IL6 and I10 production in the gastro-intestinal tract passage corresponds to improved anti-inflammatory status.

8. A composition comprising an effective amount of a Poaceae plant fibre and a *Bifidobacterium longum* subsp. *Longum* NCC 3001 probiotic, wherein said plant fibre comprises corn fiber and has an insoluble fraction of between 40 to 80% (w/w), and wherein said *Bifidobacterium longum* subsp. *Longum Bifidobacterium longum* subsp. *Longum* NCC 3001 is obtained by a process comprising the steps of
   a. Fermenting the *Bifidobacterium* in a bacterial growth medium comprising said plant fibre; and
   b. Harvesting the cultured *Bifidobacterium* probiotic.

* * * * *